(No Model.) 3 Sheets—Sheet 1.

F. M. STEVENS.
AUTOMATIC LATHE.

No. 344,926. Patented July 6, 1886.

WITNESSES:
Geo. H. Fraser.
E. B. Bolton

INVENTOR:
Frank M. Stevens
By his Attorneys,
Burke Fraser & Connett

N. PETERS, Photo-Lithographer, Washington, D. C.

(No Model.)  3 Sheets—Sheet 2.

F. M. STEVENS.
AUTOMATIC LATHE.

No. 344,926. Patented July 6, 1886.

WITNESSES: Geo. H. Fraser, E. B. Bolton

INVENTOR: Frank M. Stevens
By his Attorneys,
Burke, Fraser & Bennett (No Model.)
F. M. STEVENS.
AUTOMATIC LATHE.
No. 344,926. Patented July 6, 1886.
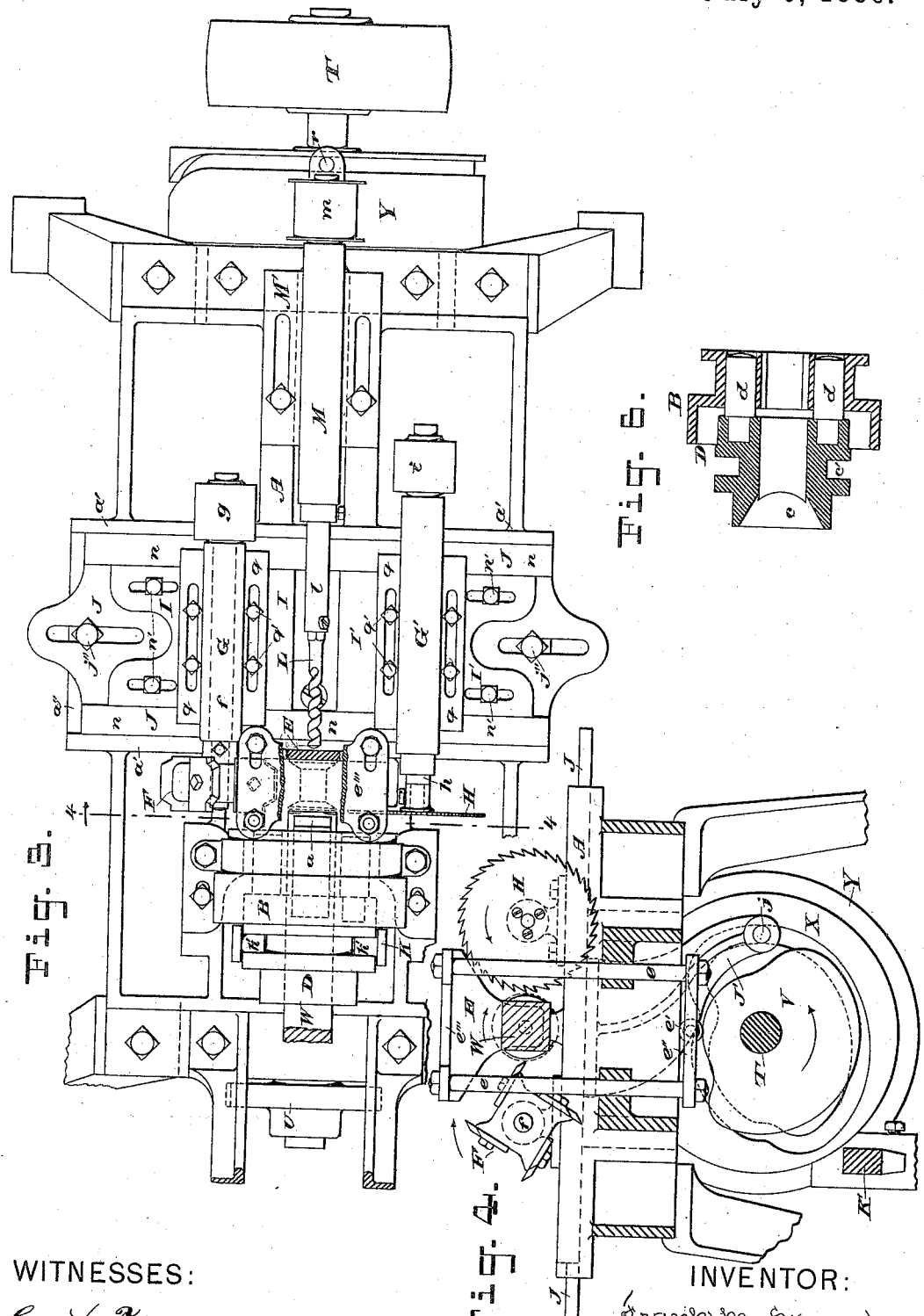
WITNESSES:
Geo. H. Fraser.
E. B. Bolton
INVENTOR:
Francis M. Stevens
By his Attorneys,
Burke, Fraser & Connett

United States Patent Office.

FRANK M. STEVENS, OF NEW YORK, N. Y.

AUTOMATIC LATHE.

SPECIFICATION forming part of Letters Patent No. 344,926, dated July 6, 1886.

Application filed September 28, 1885. Serial No. 178,367. (No model.)

*To all whom it may concern:*

Be it known that I, FRANK M. STEVENS, a citizen of the United States, residing in the city, county, and State of New York, have invented certain new and useful Improvements in Automatic Lathes, of which the following is a specification.

The object of my invention is the production of an improved machine for automatically turning, drilling, shaping, or otherwise forming small articles of wood or other material, such as spools, bobbins, cylindrical boxes, pins, turned knobs, rosettes, &c.

My improved machine operates upon a long strip of wood or other raw material, holding it near one end in a chuck. The turning or shaping and drilling tools operate upon the projecting end of the strip and form it into the finished article, which is then severed and drops beneath. The chuck then releases its hold, the strip is pushed forward and is again gripped by the chuck, and the cutting-tools operate upon it to form the next article.

For making spools and similar articles, the cutting-tools consist of a shaper for turning the sides of the spool, a drill for boring the hole through the spool, and a saw for severing the spool thus finished from the strip of wood. These tools are caused to work successively, being caused to advance against the work and recede therefrom by means of cams or other equivalent mechanical devices. A stop is provided to determine the amount of feed of the strip each time it is pushed forward, and this stop is moved out of the way of the tools after the strip has been gripped by the chuck. The gripping and releasing of the chuck is effected through the medium of a cam or other device, and the several parts are so timed and driven that their operations are performed in close and rapid succession.

Figures 1, 5:
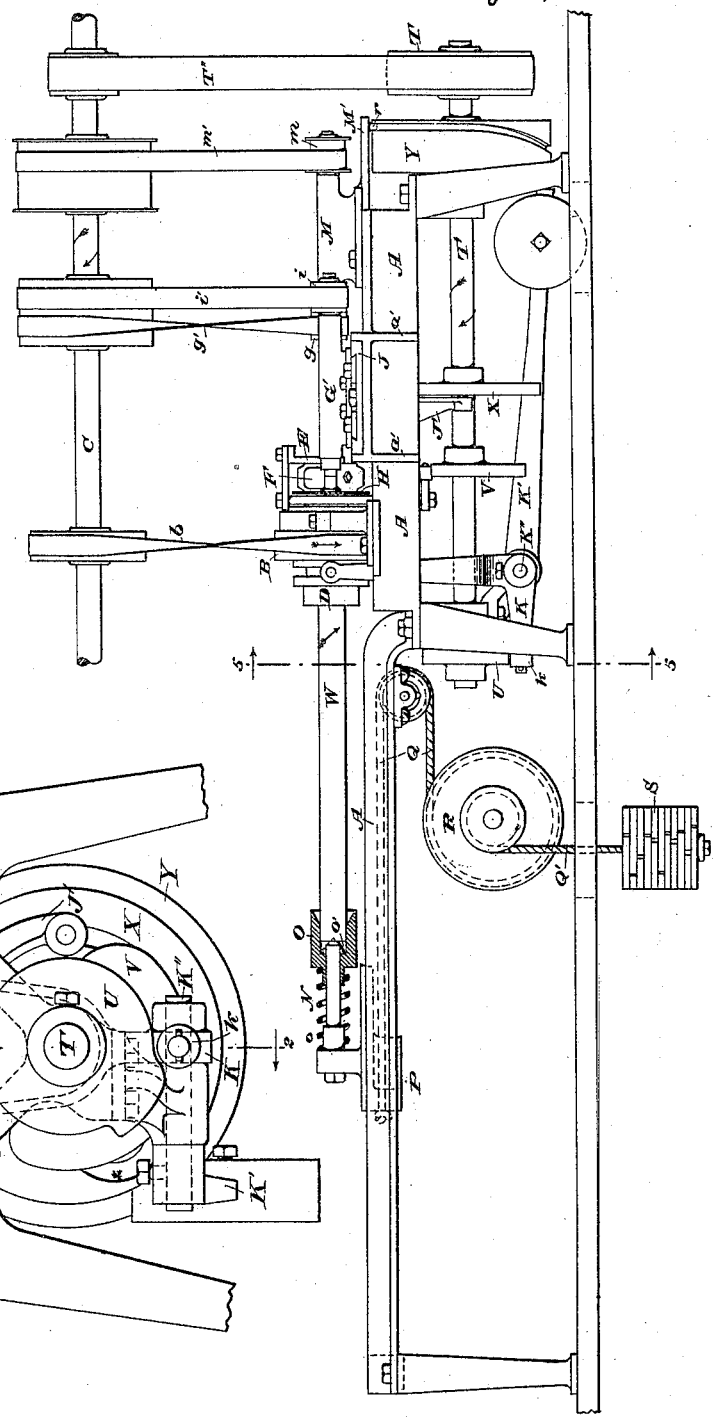
Figure 2:
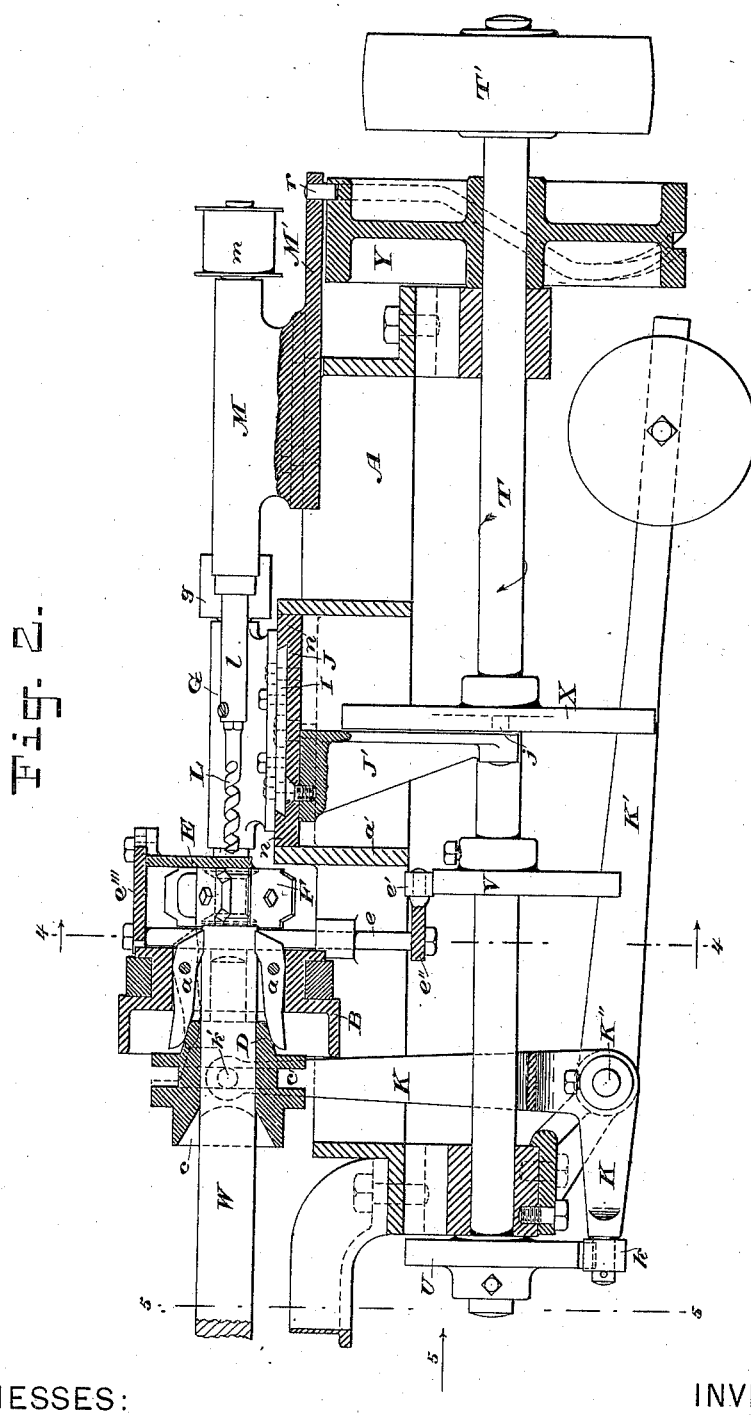

Figure 1 of the accompanying drawings is a side elevation of my machine on a small scale. Fig. 2 is a vertical longitudinal mid-section on a larger scale. Fig. 3 is a plan. Fig. 4 is a transverse section cut in the plane of the dotted lines 4 4 in Figs. 2 and 3. Fig. 5 is a transverse section on the line 5 5 in Fig. 1. Fig. 6 is a longitudinal section of the chuck and gripping device in a plane at right angles to that of Fig. 2.

The drawings show my machine as adapted for making wooden spools for thread; but my machine is by no means confined to such use, as by suitably changing the cutting-tools and making such new relative adjustments of the parts as shall be necessary, the same machine may be used for turning out any of a great variety of articles.

Referring to the drawings, let A designate, in general, the frame of the machine, which may be of cast-iron and constructed and braced in any suitable manner, in order to provide proper slideways and bearings for the moving parts. A hollow chuck, B, is mounted on a fixed bearing over the frame A, and is driven by a belt, $b$, from a counter-shaft, C, Fig. 1, which may be conveniently arranged above the machine. The strip of wood or other raw material to be acted upon (shown at W) is passed through the hollow chuck from the back, its end projecting beyond the front of the chuck at least far enough to be shaped into the spool or other article. Within the chuck are pivoted two gripping-jaws, $a\ a$, the front ends of which are brought together and caused to grip the strip of wood by means of a spreader, D, made in the form of a cone, which, when moved toward the front, spreads the tails of the jaws apart. This cone D turns with the chuck, being provided with two pins, $d\ d$, which project forward and enter holes $d'$ in the chuck, as shown best in Fig. 6. In front of the chuck is a stop, E, which acts to limit the extent to which the strip of wood shall be fed forward. It stands in the way of the strip until the end of the latter has been pushed forward against it and gripped by the jaws of the chuck, whereupon it moves upwardly far enough to be out of the way. At one side of the projecting end of the strip of wood is arranged a cutter-head or shaper, F, the cutter blades or knives of which are formed of the proper outline for cutting the sides of the spool or other article to be formed. This cutter-head is fixed on the end of a spindle, $f$, which is mounted in a long bearing, G, and has a driving-pulley, $g$, fixed on its opposite end. This pulley is driven by a belt, $g'$, from the counter-shaft C. On the opposite side of the projecting end of the piece of wood W is arranged a circular saw, H. This saw is fixed on one end of a spindle, $h$, which is mounted in a long bearing, G', and has a pulley, $i$, fixed on its opposite end. This pulley is driven by a belt, $i'$, from the counter-shaft C. The two bearings G and G' are both fixed on the top of a slide, J, which is mounted on ways on the frame A, so as to be capable of sliding thereon in a transverse direction.

The cutter or shaper F is arranged on one side of the turning axis, and the saw or severing-tool H is on the opposite side thereof on the slide J. As this slide moves in one direction it brings the cutter F up to its work, and as it moves in the opposite direction this cutter is caused to recede, and the saw H is moved up and cuts off the finished spool.

On the same axis with the chuck B is arranged a drill, L, which is held at one end of a spindle, $l$, mounted in a bearing, M, and having fixed on its opposite end a pulley, $m$, which is driven by a belt, $m'$, from the counter-shaft C. The bearing M is mounted in longitudinal ways on the frame A, so that it may slide back and forth longitudinally of the frame. As it moves forward the drill L enters the wood and bores the hole in the spool. This operation is performed after the stop E has moved up and before the saw H commences to act. Then the drill is carried back out of the way in time to leave the spool free to drop at the instant when it is severed by the saw. The strip W is fed up by a pusher back-center, N, which pushes against it constantly, being impelled by the tension of a weight or spring. This back-center is carried by a slide P, which is mounted on longitudinal slide-ways on the frame A, so that it may slide up close to the chuck B, enabling the center N to enter the cone D in order to feed the latter portion of the strip. The slide P is moved by a rope, (or other flexible connection,) Q, which winds on a drum, R, and on a part of this drum, of smaller diameter, winds a rope, Q', which carries at its end a weight, S. The running down of the weight feeds forward the strip W; or, in lieu of the weight, the drum R may have a spring coiled within it. A handle may be provided to facilitate pulling back the slide P when it is desired to enter a fresh strip of wood.

The strips of wood W are first got out in the square, of the proper size to turn down to desired diameter for the spool or other article. The holes through the cone D and chuck B are square, to receive and guide the strip. To facilitate entering the strip, the cone D is formed with a bell-mouth, as shown at $c$ in Figs. 2 and 6. When one strip is nearly consumed and it becomes necessary to enter another, this is done without stopping the machine by first pulling back the slide P, thus winding up the weight S, then placing one end of the new strip against the center N, then directing the other end into the bell-mouth of the cone D, and letting the slide run forward until the advancing end of the strip enters the cone and comes against the remaining portion therein of the preceding strip, which it pushes out through the chuck. The spool made from the end portions of the two strips is apt to be defective; but this waste is preferable to the loss of time incident to stopping the machine whenever a new strip has to be inserted.

To facilitate centering the strip against the back-center N, a bell-mouthed centering-guide, O, is placed on the pin forming the back-center, and pressed forward by a spring, $o$, a pin, $o'$, serving as a stop. When the strip of wood is nearly used up, the guide O strikes the cone D, and ceases to advance, while the back-center advances within it, entering the cone, the spring $o$ being compressed.

I will now describe how the several moving parts are operated in proper succession. Beneath the chuck B and drill L, and parallel with the axes thereof, is mounted a cam-shaft, T, having bearings hung from the under side of the frame A. A pulley, T', is fixed on one end of this shaft, and is driven from the counter-shaft C by a belt, T''. The shaft T revolves somewhat slowly, and to each revolution which it executes one spool or other article is completed. On this shaft are fixed four cams or cam-wheels, U, V, X, and Y. The cam U controls the gripping and releasing of the chuck B. Against the periphery of this cam is arranged a roller, $k$, borne on the end of one arm of an elbow-lever, K, the other arm of which extends upwardly and is forked to straddle the shaft T and the spreader D, and the ends of the fork carry pins $k'$ $k'$, which enter on opposite sides a groove, $c'$, in the spreader. On the rock-shaft K'', on which the lever K is fixed, is also fixed an arm, K', which bears a weight on its end, as shown; or a spring might be coiled upon the shaft K''. The weight (or spring) tends to force the spreader D to the right, in Fig. 2, and thereby to spread the tails of the chuck-jaws $a$ $a$, and grip the work. When the irregular perimetral face of the cam-disk U presses down the roller $k$, the spreader D is thereby moved to the left in Fig. 2, and the strip W is released and permitted to feed forward.

The cam V controls the lifting of the stop E. It is a disk-cam, the perimeter of which acts upon a roller, $e'$, pivoted at the bottom of the frame which carries the stop. This frame consists, as seen in Fig. 4, of two vertical rods, $e$ $e$, sliding freely in holes in the frame A, with a cross-bar, $e''$, at the bottom, and a plate, $e'''$, at the top.

The stop E is a vertical plate with a flange at top, through which bolts are passed to fasten it to the plate $e'''$. The bolts enter slots in the latter plate by which the stop may be set closer to or farther from the chuck B, in order to provide for different lengths of the spools or other articles to be turned.

The cam X operates the slide J, carrying the shaper-head F and the saw H. This cam consists of a circular disk or wheel with a sinuous groove in one face into which groove projects a pin, *j*, on a bracket, J', fixed to the under side of the slide J. The greater portion of the groove in the cam is concentric, holding the slide at mid-stroke, as shown in Fig. 4, this being the position which it maintains while the strip W is being released, fed forward, and again gripped. The groove in the cam then deviates outwardly, thereby moving the slide to the right in Fig. 4, and bringing the cutter-head F up to its work. The groove then deviates inwardly, thus moving the slide to the left in Fig. 4, and bringing the saw H up to the work, and it then curves outwardly and joins the concentric portion.

The slide J may have any suitable sliding bearings in the frame A. I have shown it as depressed between ribs *a' a'*, and resting at its ends on webs *a" a"*, to which it is held down by tap-screws *j"*, passed down through slots in the slide.

Each of the bearings G G' is made adjustable in two directions on the slide J.

Planted on the top of the slide J are two plates, I I', which are confined to the slide J by overhanging or dovetailed flanges *n n*, formed on the latter, so that the plates I I' may be moved toward or from the middle of the slide, being fastened by screws *n' n'*.

On the plate I is mounted the bearing G, and on the plate I' is mounted the bearing G'. These bearings have flanges *q q*, which rest on the plates I I', and are fastened to the latter by screws *q' q'*, passing through elongated slots in the flanges, by means of which the bearings may be moved to the right or left in Fig. 3.

The cam Y operates the sliding drill-bearing M to move the drill up to its work and carry it back. The bearing M is mounted on a sliding plate, M', the tail of which carries a pin, *r*. The cam Y is essentially a cylinder with a sinuous groove in its peripheral face, into which groove the pin *r* projects. The groove is of such shape that it moves the drill up to its work after the stop E lifts and retracts it before the saw H begins to act. The drill should do its work while the cutter F is being advanced.

The machine will require more or less modification to adapt it to different sorts of work; but as such modifications are within the knowledge of any workman who is thoroughly skilled in the art of wood working and turning, I have not deemed it necessary to illustrate them.

Although I have illustrated my invention so fully in detail and described it so explicitly, it must not be inferred that I am necessarily limited to the details shown and described, as the machine is susceptible of considerable alteration in matters of detail and construction without departing from the essential features of my invention.

I am aware that automatic lathes have been heretofore made which provide for the automatic feeding of a strip of the material through a hollow chuck, and which have tools which automatically shape, drill, and sever the projecting end of the strip. In one such machine the strip is fed by an intermittent feeding mechanism, whereby it is pushed forward by one set of jaws and held by another set of jaws while the feeding-jaws are moved back to take a fresh hold. This construction does not admit of as ready adjustment of the length of feed as in my machine, where the strip is gripped in the chuck and is fed forward against an adjustable stop when the chuck is released by the gripper-jaws.

What I claim as new, and desire to secure by Letters Patent, is—

1. The combination, to form an automatic lathe, of a revolving hollow chuck, gripping-jaws in said chuck for grasping the strip of material to be operated on, a spreader for operating said jaws, feeding mechanism for advancing the strip of material through said chuck, and driving mechanism, substantially as set forth, adapted to intermittently move said spreader in order to release and re-engage said jaws.

2. The combination of a revolving hollow chuck, gripping-jaws in said chuck, a spreader for operating said jaws, a pusher for feeding the strip of material through said chuck, a stop to arrest the advancing end of said strip, and driving mechanism, substantially as set forth, adapted to intermittently move said spreader, thereby releasing said jaws and permitting the strip to be fed against said stop, and again closing said jaws upon it, to the effect described.

3. The combination of a revolving hollow chuck, gripping-jaws in said chuck for grasping the strip of material, a spreader for operating said jaws, a pusher sliding in the turning axis toward and from the chuck and adapted to engage the end of the strip of material, mechanism for impelling said pusher toward the chuck under the tension of a weight or spring, a stop to arrest the advancing end of the strip, and driving mechanism, substantially as set forth, adapted to move said spreader at intervals to release said jaws and permit the strip to be fed through them against said stop, and to re-engage said jaws.

4. The combination of a hollow revolving chuck, gripping-jaws in said chuck, a spreader for operating said jaws, feeding mechanism for advancing the strip of material through said chuck, a stop to arrest the advancing end of said strip, a severing-tool for cutting off the finished article from said strip, and driving mechanism, substantially as set forth, adapted to alternately move said severing-tool against the work and manipulate said spreader to release the jaws and permit the strip to be fed forward, substantially as described.

5. The combination of a hollow revolving chuck, gripping-jaws pivoted therein, a spreader acting against the tails of said jaws, a spring or weight connected to said spreader and tending to force it against the jaws and thereby to close the jaws upon the strip of material, a driving-shaft, a cam on said shaft, and mechanism intervening between said cam and spreader, whereby the said cam intermittently withdraws said spreader and releases said jaws, substantially as set forth.

6. The combination of hollow revolving chuck B, gripping-jaws *a a*, pivoted therein, spreader D, capable of moving toward and from said chuck, lever K, engaging said spreader, cam U, acting against said lever, shaft T, carrying said lever, and a weight or equivalent acting upon said lever in opposition to said cam, substantially as set forth.

7. The combination of a revolving hollow chuck, gripping-jaws therein for grasping the strip of material, a spreader for operating said jaws, a pusher for feeding the strip of material, a stop for arresting the end of said strip, capable of moving out of the path thereof, a cam-shaft and cams thereon, and mechanical connection between said cams and said spreader and stop, respectively, substantially as set forth, whereby the spreader is intermittently moved to release the gripping-jaws and permit the strip to feed forward against the stop, and after the strip is gripped the stop is moved away and again returned before the strip is again released.

8. The combination of hollow revolving chuck B, gripping-jaws *a a*, pivoted therein, spreader D, engaging said jaws, lever K, engaging and moving said spreader, cam U, acting upon and vibrating said lever, cam-shaft T, stop E, for limiting the feed of the strip through said chuck, the frame bearing said stop, and cam V on said shaft, for lifting and dropping said frame and stop, all adapted to operate substantially as set forth, whereby during the interval between the gripping and releasing of said jaws the said stop is caused to lift out of the way of the strip and to drop back to place again.

9. In an automatic lathe, the combination of a hollow revolving chuck for holding the material to be worked, a slide or frame moving in a lateral direction relatively to the turning-axis, a cutter for shaping the material mounted on said frame on one side of the turning-axis, a severing-tool mounted on said frame on the opposite side of the turning-axis, and driving mechanism adapted to move said frame from its normal mid-position to one side, thereby bringing said cutter up to the work, then to the other side, thereby bringing said severing-tool up to the work, and finally back to its mid-position, substantially as set forth.

10. The combination, in an automatic lathe, of a hollow revolving chuck for holding the material to be worked, a cutter for shaping said material, a tool for severing the finished article, a slide, J, carrying said cutter and said severing-tool on opposite sides of the turning-axis, a pin or projection connected to said slide, and a revolving cam, V, engaging said projection and shaped to move said slide from its normal mid-position to one side in the direction to bring said cutter up to its work, and then in the contrary direction, to recede said cutter and bring said severing-tool up to its work, and finally back to its normal position, substantially as set forth.

11. In an automatic lathe, the combination of a hollow revolving chuck, B, a feeding mechanism for intermittingly advancing a strip of the material to be acted on through said chuck, a stop, E, in front of said chuck capable of moving out of the way of said strip, a transverse slide, J, a severing-tool, H, carried by said slide, a longitudinal slide, M, moving parallel with the turning-axis, a cam-shaft, T, a cam, U, thereon connected to and a controlling the feeding mechanism, a cam, V, thereon connected to and operating said stop to displace the same, a cam, X, connected to and reciprocating said transverse slide, and a cam, Y, connected to and reciprocating said longitudinal slide, substantially as set forth.

In witness whereof I have hereunto signed my name in the presence of two subscribing witnesses.

FRANK M. STEVENS.

Witnesses:
FERDINAND DAVIS,
J. E. DEWEY.